UNITED STATES PATENT OFFICE.

WILLIAM W. DUNNETT, OF BALTIMORE, MARYLAND, ASSIGNOR OF ONE-HALF TO NICHOLAS M. RITTENHOUSE, OF SAME PLACE.

COMPOSITION OF MATTER.

SPECIFICATION forming part of Letters Patent No. 450,560, dated April 14, 1891.

Application filed December 18, 1890. Serial No. 375,088. (No specimens.)

*To all whom it may concern:*

Be it known that I, WILLIAM W. DUNNETT, a citizen of the United States, residing at Baltimore, State of Maryland, have invented new and useful improvements in composition of matter, to be used as a luting or packing for pipe-joints and as grouting for masonry and tile-work, of which the following is a specification.

My composition consists of the following ingredients combined in suitable proportions: Pulverized flint, lava, pumice-stone, or vitrified clay, sulphur, lamp-black, or other coloring-matter.

In preparing this composition of matter I melt, say, three pounds of sulphur and add thereto about one pound of pulverized flint and a suitable quantity of lamp-black or other coloring-matter to impart the desired tint to the mixture. The compound may be prepared in an open or closed retort or other suitable vessel to which heat can be applied. While still subjected to heat the mixture should be stirred until the ingredients are thoroughly incorporated with each other. The composition is preferably prepared in a closed retort, with practically continuous stirring until it is observed that no bubbles of gas remain on the surface, as the more sulphurous gas retained in the mass the better will be the product. Before the mixture cools it can be turned out into molds, and thus formed into blocks of convenient size for storage or transportation. When the composition is required for use, these blocks or cakes are remelted, and this remelting improves the character of the composition by imparting a suitable temper, and increases its strength and durability when applied to its intended uses.

This composition is adapted for use as a packing or luting for the joints of gas or water pipes, sewers, ventilating-pipes, soil-pipes, &c., and as a foundation and grouting for walls, sewers, channel-pipes, drains, and various kinds of masonry and tile-work.

When used in large crevices, as between the heavy stones of foundations or in connecting the joints of large pipes and where considerable spaces are to be closed, this composition can be economically used to advantage with intermediate or alternating layers of hot and ground burnt clay.

Instead of pulverizing flint, I may use pumice-stone, lava, or vitrified clay; but the flint is preferred, as it gives more body and durability to the compound.

I may also vary the proportions of the sulphur and flint, or other ingredients, and so make the composition of greater or less consistence. By diminishing or increasing the proportional quantity of sulphur the compound may be made thick or thin, as required. The larger the quantity of flint employed the heavier or stiffer will be the composition. Thus two pounds of flint and two pounds of sulphur will make a very thick and heavy composition for pouring into great crevices. I would therefore have it understood that I do not confine myself to any precise proportions of the ingredients employed. Among other advantages of this composition the sanitary benefits due to the employment of sulphur are important.

Besides its uses as a luting and grouting, the above-described composition may be employed for closing and securing the joints of iron railings, posts, or columns, and for many other similar purposes.

What I claim as my invention is—

The herein-described composition of matter, consisting of sulphur, pulverized flint, or its equivalent, and coloring-matter, in about the proportions and for the purpose set forth.

In testimony whereof I have hereunto set my hand in presence of two subscribing witnesses.

WILLIAM W. DUNNETT.

Witnesses:
THOS. KELL BRADFORD,
S. W. BRADFORD.